May 7, 1940.  F. C. BEST  2,199,517
MOTOR VEHICLE
Filed March 7, 1938   2 Sheets-Sheet 1
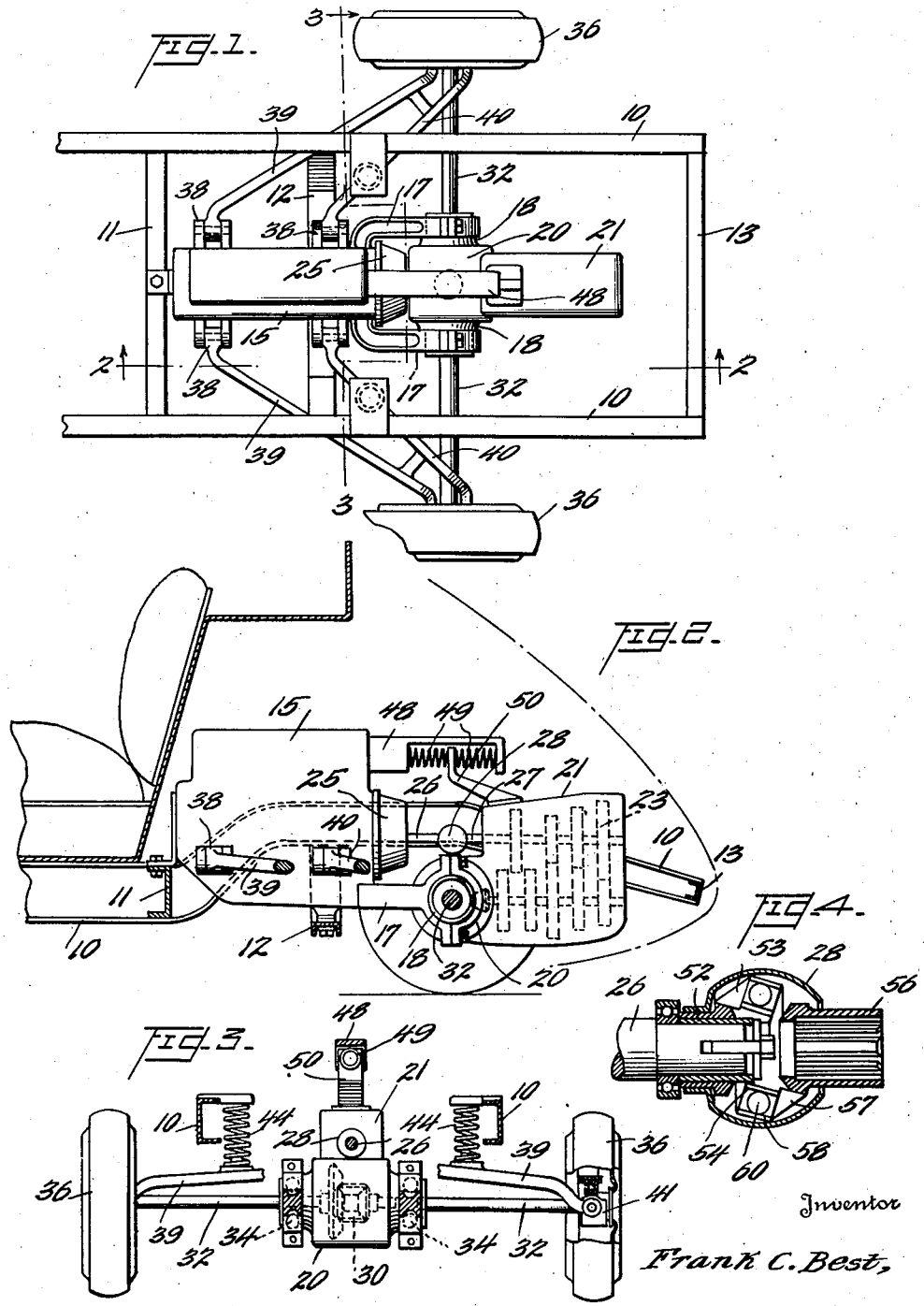

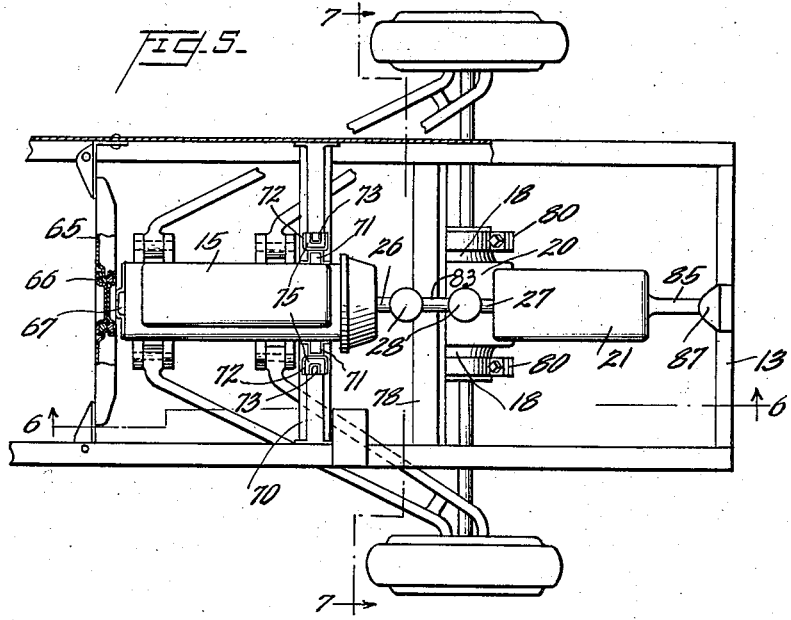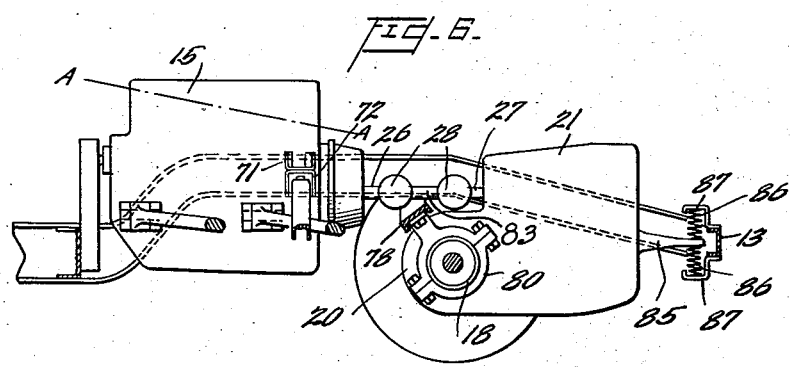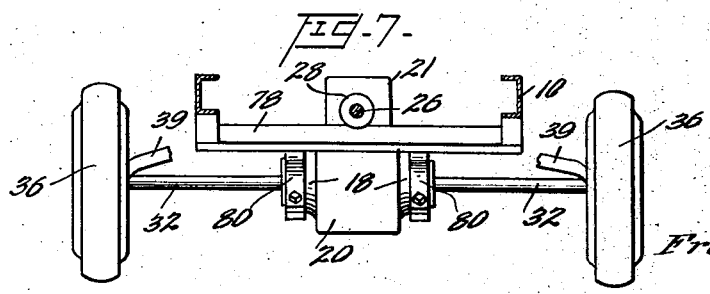

Patented May 7, 1940

2,199,517

UNITED STATES PATENT OFFICE 2,199,517

MOTOR VEHICLE

Frank C. Best, Detroit, Mich., assignor to Packard Motor Car Company, Detroit, Mich., a corporation of Michigan Application March 7, 1938, Serial No. 194,501

11 Claims. (Cl. 180—54)

This invention relates to motor vehicles and is particularly concerned with improvements in propulsion and suspension units for such vehicles.

In the well-known Hotchkiss type of drive for motor vehicles, the torque applied to the differential gearing tends to rotate the differential housing about a transverse axis, and the arrangement is such that such rotation is resisted principally or solely by the vehicle leaf springs, so that minor variations in the driving torque are smoothed out and vibrational impulses originating in the power unit are largely absorbed, with the result that the vehicle operates more quietly and with a steady flow of power. However, in certain types of suspension systems, for instance wheel suspensions of the so-called independent type employing coil springs, the suspension springs cannot perform adequately the function of resisting rotation of the differential housing.

It is therefore an object of this invention to provide a motor vehicle drive in which the absorption of power fluctuations incident to the Hotchkiss type of drive is realized, but in which rotation of the differential housing is yieldingly resisted by means other than the vehicle suspension springs, so that the wheel suspension characteristics may be varied over a wide range to afford the desired riding qualities while the characteristics of the yielding means which resists axle rotation may be so selected as to afford the optimum results in power absorption and the damping of vibrational impulses originating in the power unit.

It is a more specific object of the invention to support the differential housing of a motor vehicle for rotation about a transverse axis and to provide spring means acting alone to yieldingly resist such rotation, the vehicle suspension springs playing no part in the performance of this function.

A further object of the invention is the provision in a motor vehicle of propulsion means including an engine unit and a gearing unit disposed in contiguous relation at one end of the vehicle, the gearing unit including differential gearing operatively connected to drive the vehicle road wheels and being supported for oscillatory movement about a transverse axis, the units being so operatively connected that oscillatory movement of the gearing unit does not alter the velocity with which the differential gearing is operated despite the close proximity of the units.

In the preferred form of the invention the gearing unit includes both the differential gearing and a selective variable speed gearing, both gearing trains being supported in a unitary housing which is in turn pivoted on the engine unit for oscillatory movement about a transverse axis. In a further form of the invention, this unitary housing is pivoted directly on the vehicle frame while the engine unit is supported so as to enable the latter to rock to a limited extent about an axis extending generally longitudinally of the vehicle, whereby the reaction of fluctuating power impulses developed in the motor is largely absorbed and damped.

Further objects and features of the invention will be apparent from the following description taken in connection with the accompanying drawings in which:

Figure 1 is a plan view of the rear end of a motor vehicle chassis illustrating the application of the invention thereto;

Figure 2 is a vertical longitudinal sectional view taken substantially on the line 2—2 of Figure 1;

Figure 3 is a transverse section on the line 3—3 of Figure 1;

Figure 4 is a longitudinal sectional view of a universal joint shown in Figures 1 and 2;

Figure 5 is a plan view illustrating certain parts in section, corresponding to Figure 1 and illustrating a modified form of the invention;

Figure 6 is a longitudinal vertical sectional view taken substantially on the line 6—6 of Figure 5; and Figure 7 is a transverse sectional view taken on the line 7—7 of Figure 5.

For convenience in describing the invention, reference is made to the embodiments thereof illustrated in the accompanying drawings and specific language is used. It will nevertheless be understood that no limitation of the scope of the invention is thereby intended, various further modifications and alterations of the illustrated embodiments being contemplated such as would occur to one skilled in the art.

The drawings show the invention applied to the rear end of a vehicle, the vehicle frame comprising the side frame members 10 and cross frame members 11, 12 and 13 extending between and secured thereto. An engine unit is indicated at 15, this unit being supported on and preferably secured rigidly to the cross frame members 11 and 12.

Secured rigidly to the block of the engine unit 15 are a pair of rearwardly directed arms 17, these arms embracing bosses 18 formed at the sides of a differential housing 20, the arrangement being such that the differential housing is thereby journalled in the arms 17 for oscillatory movement about a transverse axis. A transmission gear housing 21 is secured to or formed integrally with the differential housing 20 so that these housings constitute a unitary structure, which may be referred to for convenience as the gear housing. Within the transmission housing 21 is supported a selective variable speed gearing 23, which may be of conventional type affording the various speed ratios required in the ordinary operation of a motor vehicle. The engine unit 15 is connected through a conventional clutch 25 and shafts 26 and 27 with the change speed gearing 23, a universal joint 28 being interposed between the shafts 26 and 27 to permit the gear housing to oscillate about the aforesaid transverse axis.

Differential gearing 30, supported within the differential gear housing 20 is driven directly from the countershaft of the change speed gearing 23 and serves to transmit power in the usual manner to the axles 32, universal joints 34 allowing limited lateral displacement of the axles being interposed between the differential gearing and the axles to permit the latter to swing in a vertical plane. At its outer end each of these axles carries a road wheel 36, the mounting of the road wheels on the axles being conventional.

Pivotally supported on the block of the engine unit as indicated at 38 are laterally extending links, each link being constituted by arms 39 and 40 which converge outwardly and are pivoted at their outer ends on generally horizontal axes to members 41 which are rotatably mounted on and adjacent the outer ends of the respective axles 32, the axes of pivotal connection of these links to the engine unit and the members 41 being parallel. Interposed under compression between the arm 40 of each link and the adjacent side frame member 18 is a coil spring 44, suitable spring seats being mounted on the arm and side frame member respectively to receive and support the spring.

The construction and function of the wheel suspension means just described is quite similar to that shown in my prior U. S. Letters Patent 2,090,721 granted August 24, 1937. Thus as the road wheels 36 rise and fall with respect to the frame in passing over an irregular road bed, the axles 32 are constrained to swing in a vertical plane transverse to the longitudinal axis of the vehicle by the links 39, 40, the axles partaking of such endwise movement with respect to the differential housing 20 as may be occasioned by the lack of alignment of the axes of pivotal connection of the links 39, 40 to the engine unit and the axes of the respective universal joints 34. The coil springs 44 yieldingly resist rising movement of the road wheels. It will be understood that the details of this suspension constitute no part of the instant invention except to the extent that the suspension means is coordinated with and employed in combination with other structure herein described.

Secured to the engine unit 15 and extending rearwardly therefrom is a member 48 constructed to afford a relatively stationary abutment for coiled compression springs 49. Interposed between the contiguous ends of the springs 49 and secured rigidly to the transmission housing 21 is an arm 50.

It will be understood that when torque is transmitted to the road wheels 18 through the gearing hereinbefore described, the gear housing which constitutes the reaction member of the conventional differential gearing tends to rotate about a transverse axis and within the arms 17, and further tends to rotate in a reverse direction during braking, this tendency of the housing to rotate being resisted by the coil compression springs 49. As hereinbefore pointed out, these springs may be carefully selected and calibrated to afford the desired characteristics enabling them to properly resist such oscillatory movement, to smooth out the torque impulses, and to absorb vibrational disturbances arising in the engine unit. Such selection may be made wholly independently of the characteristics of the suspension springs which support the vehicle, which springs, in the embodiment of the invention illustrated in the drawings, cooperate in no way with the springs 49. It is thus possible to ensure that the optimum result possible with the Hotchkiss type of vehicle drive may be realized regardless of the nature of the vehicle suspension means, these advantages being obtainable in a vehicle employing a coil spring independent suspension.

In view of the contiguous relation of the transmission housing 21 and the engine unit 15, it will be appreciated that during oscillatory movement of the former the angular relation between the two will be altered to a considerable extent. In order that this substantial change of the angular relation of shafts 26 and 27 will not give rise to acceleration and deceleration of the latter, I propose to construct the universal joint 28 in such manner that the two shafts always rotate in synchronism. For this purpose the joint 28 may be formed as shown in Figure 4 and as described and illustrated more particularly in the patent to Koppel 2,102,850, granted December 21, 1937.

Thus a member 52, secured to the shaft 26, may be provided with a plurality of arms 53 disposed at suitable intervals about the axis of the shaft. Each of the arms 53 is formed to provide a race 54 of parti-cylindrical shape, the axes of the races on the several arms 53 converging rearwardly. Splined on the shaft 27 for endwise movement thereon is a sleeve 56 which is provided with a plurality of arms 57, conforming in number to the arms 53, each of the arms 57 being formed to provide a parti-cylindrical race 58, the axes of the races 58 converging forwardly. The arms 53 and 57 are so arranged that each race 54 is disposed in contiguous relation to and in a position facing a race 58, and an anti-friction spherical ball is interposed between each race of a cooperating pair.

It will also be noted that owing to the forward convergence of the axes of the races 58 and the rearward convergence of the axes of the races 54, the races of a cooperating pair will be so arranged that their axes intersect at an acute angle, the center of the anti-friction ball 60 associated therewith being disposed approximately at the point of intersection of these axes. Thus as described in the Koppel patent hereinbefore referred to, the balls 60 move endwise in the races as the angular relation of the shafts 26 and 27 is varied and the construction is such that the point of connection between the cooperating arms 53 and 57 through the balls 60 is always disposed in a plane which bisects the angle formed by the axes of the shafts 26 and 27. Consequently torque will be transmitted at a constant velocity through the joint regardless of variation in such angle.

The embodiment of the invention illustrated in Figures 5, 6 and 7 is quite similar to that previously described, and similar reference characters are employed to resignate the corresponding parts. The essential difference resides in the separate mounting of the engine unit and of the gear housing, which mountings will now be described.

The mounting for the engine unit is preferable of such a nature as to permit the unit to rock about a generally longitudinally directed axis, such as that shown at A—A in Figure 6. Thus the construction illustrated and described in the prior patent to Paton 2,099,703 granted November 23, 1937, may be employed and has been selected for the purpose of illustration.

As shown in Figures 5 and 6, the forward end of the engine unit 15 is supported on a cross frame member 65, the latter being formed to provide a generally rectangular opening in which is received one or more rubber blocks 66 which surround and support a boss 67 extending forwardly from and secured to the engine unit. The rear end of the engine unit is supported on a cross frame member 70 which passes beneath the engine unit and engages with brackets 71 secured to the unit at each side thereof. It will be observed that the brackets 71 serve as a support for U-shaped members 72, the latter surrounding cooperating U-shaped members 73 carried by the cross frame member. Arranged between and surface bonded or otherwise secured to the cooperating U-shaped members 72 and 73 are U-shaped blocks or cushions 75 of rubber. The arrangement is such that the blocks 76 extend diagonally in a vertical plane transversely of the vehicle, and these blocks therefore cooperate with the rubber blocks 66 at the forward end of the engine unit to so support the latter at three points as to enable the engine unit to rock about the axis A—A and thus cushion to a large extent the torque reactions developed therein. The details of this construction form no essential part of the instant invention and may be modified substantially, the mounting of engine units to permit lateral rocking being a common expedient.

A cross frame member 78 serves to support the gear housing consisting of the differential housing 20 and the transmission housing 21, the laterally extending bosses 18 formed on the differential housing being journalled in arms 80 secured to the cross frame member. As in the previously described form of invention, the gear housing is thereby so supported as to permit rocking movement thereof about a transverse axis.

While the engine unit and the transmission gearing may be operatively connected in this form of the invention through a single universal joint, I prefer to provide two joints indicated generally at 28, these joints being constructed so as to ensure synchronous rotation of the shafts 26 and 27 which extend from the respective units, the universal joints being connected by a short shaft 83 as shown in Figures 5 and 6.

Projecting from the rear of the transmission housing 21 is an arm 85, this arm extending between and engaging the contiguous ends of coil springs 86 which are received in seats 87 secured to the cross frame member 13 at the extreme rear of the vehicle. The function of these springs 86 is similar to the function of the previously described coil springs 49, rocking of the gear housing about a transverse axis being thereby resisted to the extent necessary to equalize torque impulses and absorb vibrations as in the more conventional form of Hotchkiss drive.

The wheel suspension illustrated in the form of the invention shown in Figures 5–7 is identical with that shown in Figures 1–4 inclusive and is of the independent type employing coil springs. Thus in this form of the invention as in that previously described, the coil springs 86 afford the only yielding resistance offered to rotation of the gear housing. The use of two universal joints in this form of the invention affords such a degree of flexibility between the engine unit and the gear housing that the former may readily rock about a generally longitudinal axis while the latter rocks about the aforesaid transverse axis.

Having thus described the invention, what is claimed as new and desired to be secured by Letters Patent is:

1. In a motor vehicle, the combination with a vehicle frame and road wheels, of means yieldably supporting said frame on said wheels, means including differential gearing for transmitting driving power to said wheels, a housing for said gearing, an engine unit supported rigidly on said frame, means supporting said housing on said engine unit for rotation about a transverse axis, and yielding means separate from said first named means and acting alone between said frame and housing to resist rotation of the latter.

2. In a motor vehicle, the combination with a vehicle frame and road wheels, of means yieldably supporting said frame on said wheels, means including differential gearing for transmitting driving power to said wheels, a housing for said gearing, an engine unit supported rigidly on said frame, and means supporting said housing on said engine unit for oscillation about a transverse axis.

3. In a motor vehicle, the combination with a vehicle frame, of an engine unit mounted on said frame, a differential unit including a differential housing pivotally supported on said engine unit for oscillation about a transverse axis, and means acting between said frame and housing for yieldably resisting oscillation of the latter.

4. In a motor vehicle, the combination with a vehicle frame, of an engine unit mounted on said frame, a differential unit including a differential housing pivotally supported on said engine unit for oscillation about a transverse axis, differential gearing in said housing, and means including a constant velocity universal joint drivingly connecting said engine unit and gearing.

5. In a motor vehicle, the combination with a vehicle frame, of an engine unit and a differential gearing unit supported for relative movement on said frame adjacent one end of the latter, means confining movement of said gearing unit with respect to said frame to rotation about a transverse axis, means mounting said engine unit on said frame for oscillatory movement about a generally longitudinal axis, and means affording a driving connection between said units, said last named means including a constant velocity universal joint.

6. In a motor vehicle, the combination with a vehicle frame, of an engine unit and a differential gearing unit supported for relative movement on said frame adjacent one end of the latter, means confining movement of said gearing unit with respect to said frame to rotation about a transverse axis, means mounting said engine unit on said frame for oscillatory movement about a generally longitudinal axis, and means affording a driving connection between said units, said last named means including a pair of constant velocity universal joints arranged in series.

7. In a motor vehicle, the combination with a vehicle frame and road wheels, of means yieldably supporting said frame on said wheels, means including differential gearing for transmitting driving power to said wheels, a housing for said gearing, means supporting said housing on said frame for free rotation about a fixed transverse axis which is substantially coincident with the axis of the differential gearing, and yielding means separate from the said first named means and acting alone between said frame and housing to resist rotation of the latter but permitting the relatively large rotative displacement of the housing about said axis under the influence of the torque reaction.

8. In a motor vehicle, the combination with a vehicle frame and road wheels, of means yieldably supporting said frame on said wheels, means including differential gearing for transmitting driving power to said wheels, a housing for said gearing, means supporting said housing on said frame for substantially free rotation about a transverse axis, and yielding means separate from said frame supporting means and also separate from said housing supporting means and acting alone between said frame and housing to resist rotation of the latter, but being so constructed and arranged as to permit the relatively large rotative displacement of the housing about said axis under the influence of the torque reaction.

9. The combination set forth in claim 8 in which the housing is a unitary housing which also contains a selective variable speed gearing as well as the differential gearing.

10. The combination set forth in claim 8 in which the yielding means comprises a coil compression spring disposed between a portion of said housing and a part of said frame.

11. The combination set forth in claim 8 in which the road wheels are independently mounted driving wheels, and in which coil springs are provided for yieldably supporting the frame on said wheels.

FRANK C. BEST.